Patented Aug. 7, 1945

2,381,410

UNITED STATES PATENT OFFICE 2,381,410

MANUFACTURE OF HYDROXYLAMINE HYDROCHLORIDE AND CARBOXYLIC ACIDS

Philip F. Tryon, Terre Haute, Ind., assignor to Commercial Solvents Corporation, Terre Haute, Ind., a corporation of Maryland No Drawing. Application June 25, 1942,
Serial No. 448,442

4 Claims. (Cl. 23—87)

My invention relates to a process for the production of hydroxylammonium chloride, and carboxylic acids. More particularly, it relates to the production of hydroxylammonium chloride and carboxylic acids by the reaction of a primary nitro hydrocarbon with hydrochloric acid.

My process consists essentially of reacting approximately equivalent amounts of a primary nitro hydrocarbon and hydrochloric acid in the presence of a carboxylic acid, such as propionic acid, in sufficient quantity to act as a solvent for both the primary nitro hydrocarbon and the hydrochloric acid, and at a reflux temperature of from 80° C. to 120° C. The reaction is preferably effected at atmospheric pressure, at a temperature of 90° C. to 111° C.

When reacting a primary nitro hydrocarbon with hydrochloric acid according to my improved process, one of the reaction products is the corresponding carboxylic acid. Therefore, it is advantageous, in order to avoid separating two carboxylic acids, to employ the same carboxylic acid in the reaction mixture as is formed in the reaction. The primary function of the carboxylic acid is to obtain a homogeneous mixture, thereby effecting a better contact of reactants, which will in turn decrease the time required for the completion of the reaction. A sufficient quantity of carboxylic acid to act as a mutual solvent, therefore, should be used. The reaction may be effected without the presence of a carboxylic acid, but the time required for completion of the reaction is much greater than when utilizing a carboxylic acid in the reaction. The concentration of carboxylic acid employed in the reaction mixture will, of course, vary with each particular reaction. However, by simple experiment, the concentration may be determined for any particular reaction.

The hydrochloric acid employed in the reaction is preferably constant boiling hydrochloric acid in order that the reaction will require but little, if any, attention. However, percentages of acid other than a constant boiling percentage may be employed with proper control of temperature conditions. For example, when using a 25 per cent hydrochloric acid the reaction is preferably started at a temperature of 97° C., to prevent loss of the hydrogen chloride; gradually the temperature is then raised to 110° C., and maintained at that temperature for several hours.

As heretofore stated, I prefer to use constant boiling hydrochloric acid in the reaction for the reason that the reaction temperature does not have to be regulated as closely as the reactions utilizing other concentrations of hydrochloric acid. When utilizing constant boiling hydrochloric acid, it is only necessary to mix equivalent amounts of the nitro hydrocarbon and constant boiling hydrochloric acid with enough carboxylic acid to form a homogeneous mixture at the reflux temperature and then reflux the mixture for several hours. The temperature of the reaction mixture remains between 95° C. and 110° C. with little, if any, adjustment of the heat source. After the reaction is essentially completed water, unreacted reagents, and carboxylic acid are removed from the reaction mixture by any suitable means, preferably by distillation at reduced pressure. The residue is cooled, filtered, and washed. The crystalline product thus obtained is preferably dried for approximately two hours at an elevated temperature within the range of 70–80° C.

I have found the reaction to be very general, and as a result any of the primary nitro hydrocarbons may be used in this reaction. Relatively high percentage yields of high purity products have been obtained using the primary nitroparaffins, such as nitromethane, nitroethane, nitropropane, nitrobutane, and the like. Any of the carboxylic acids may be utilized as mutual solvents in my process, such as for example, acetic, propionic and butyric acids. In general it may be said that the aliphatic carboxylic acids that are water soluble are preferred.

My invention may be further illustrated by the following specific examples:

*Example I*

Hydroxylammonium chloride and propionic acid were prepared by refluxing a mixture consisting of 98 parts of 1-nitropropane, 190 parts of constant boiling hydrochloric acid, and 200 parts of propionic acid, for 24 hours, at a temperature of 102–107° C. and atmospheric pressure. The water, unreacted reagents, and propionic acid were then distilled off at 63–75° C., and 200 mm. pressure, after which the concentrated residue was cooled to approximately 20° C., filtered, and washed twice with ether. The crystals obtained in this manner were then dried at 60° C. for one and one-half hours, on a hot plate, yielding 57 parts of hydroxylammonium chloride of 94% purity, corresponding to a conversion of 77%, based on 100% material. Making allowance for the recoverable 1-nitropropane found in the reaction mixture, the yield of hydroxylammonium chloride, based on 100% material, was 88%.

Example II

A mixture of 98 parts of 1-nitropropane, 146 parts of 25 per cent hydrochloric acid, and 200 parts of propionic acid was refluxed slowly at 97° C. and atmospheric pressure. Over a total period of 12 hours reflux, the liquid temperature was raised gradually to 110° C. The propionic acid and hydroxylammonium chloride thus prepared were separated and purified according to the procedure outlined in Example I for the recovery of the reaction product, and the hydroxylamine hydrochloride corresponded to a yield of about 93 per cent, taking into account the recoverable 1-nitropropane, or a conversion of about 73%.

Example III

A mixture consisting of 75 parts of nitroethane, 190 parts of constant boiling hydrochloric acid, and 100 parts of acetic acid, was refluxed for a period of 12 hours over an increased liquid-temperature range of 94–102° C. The acetic acid and hydroxylammonium chloride thus prepared were separated and purified according to the procedure outlined in Example I.

Example IV

A mixture consisting of 106 parts of 1-nitrobutane, 190 parts of constant boiling hydrochloric acid, and 300 parts of propionic acid, was refluxed over an increased liquid-temperature range of 104–109° C. for a period of 20 hours. The reaction products were then separated and purified according to the procedure outlined in Example I.

In order to illustrate the advantage of utilizing a carboxylic acid in the reaction, preferably in sufficient amounts to render the reaction mixture homogeneous, an example is given in which no carboxylic acid was employed.

Example V

A mixture consisting of 108 parts of 1-nitropropane and 210 parts of constant boiling hydrochloric acid, was refluxed for a period of 24 hours at a liquid temperature of 100–101° C. The mixture was 2-phase throughout the reaction period. Upon separating the reaction products according to the procedure outlined in Example I, it was found that only 24% of the nitropropane had reacted.

Now having described my invention, what I claim is:

1. In a process for the production of hydroxylammonium chloride and carboxylic acids from primary nitro hydrocarbons, the step which comprises refluxing a primary nitro hydrocarbon and constant boiling hydrochloric acid, in the presence of an initially-added carboxylic acid at atmospheric pressure, said carboxylic acid being employed in an amount sufficient to produce a homogeneous mixture with said hydrochloric acid and nitro hydrocarbon.

2. In a process for the production of hydroxylammonium chloride and carboxylic acids from primary nitro hydrocarbons, the step which comprises subjecting a primary nitro hydrocarbon to the action of constant boiling hydrochloric acid at a temperature in excess of 80° C., and below 120° C. in the presence of an initially-added carboxylic acid at atmospheric pressure, said carboxylic acid being employed in an amount sufficient to produce a homogeneous mixture with said hydrochloric acid and nitro hydrocarbon.

3. In a process for the production of hydroxylammonium chloride and carboxylic acids from primary nitro hydrocarbons, the step which comprises reacting, at atmospheric pressure, substantially equivalent amounts of a primary nitro hydrocarbon and constant boiling hydrochloric acid at a temperature in excess of 90° C., and below 111° C. at atmospheric pressure in the presence of an initially-added carboxylic acid having the same carbon content as the nitroparaffin, and said carboxylic acid being present in an amount sufficient to constitute a homogeneous mixture, of nitro hydrocarbon and constant-boiling hydrochloric acid.

4. In a process for the production of hydroxylammonium chloride and carboxylic acids from primary nitroparaffins and constant boiling hydrochloric acid, the step which comprises reacting a primary nitroparaffin and said constant boiling hydrochloric acid at reflux temperature and atmospheric pressure, in the presence of a sufficient amount of an initially-added carboxylic acid to act as a solvent for both the nitroparaffin and said hydrochloric acid at the reflux temperature of the reaction mixture, said carboxylic acid being the same as the acid formed by the reaction.

PHILIP F. TRYON.